United States Patent Office 3,467,662
Patented Sept. 16, 1969

3,467,662
1-PARA-CHLOROPHENYL-3-HYDRAZINO - 1,5,6,7,8, 8a-HEXAHYDROIMIDAZO[1,5-a]PYRIDINE AND PROCESS FOR ITS PREPARATION
Albert J. Frey, Essex Fells, and Robert E. Manning, Mountain Lakes, N.J., assignors to Sandoz Inc., Hanover, N.Y.
No Drawing. Filed Oct. 5, 1967, Ser. No. 672,990
Int. Cl. C07d *31/02, 31/40*
U.S. Cl. 260—293                                   3 Claims

ABSTRACT OF THE DISCLOSURE

This disclosure pertains to novel 1-substituted 2-unsubstituted imidazopyridines, for example 1-para-chlorophenyl - 3 - hydrazino - 1,5,6,7,8,8a - hexahydroimidazo [1,5-a]pyridine. These compounds are useful as hypotensive agents.

---

This invention is directed to novel heterocyclic compounds and more particularly to novel substituted imidazopyridines. Still more particularly, this invention pertains to a 1-p-chlorophenyl-2-unsubstituted-3-hydrazinoimidazo[1,5-a]pyridine. This invention also concerns methods for preparing said compound, intermediates therefor, and to methods for preparing said intermediates.

The 3-hydrazino imidazo pyridine of this invention may be represented by the formula

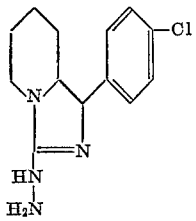

This compound (I) is prepared by treating a corresponding 3-loweralkylthio imidazopyridine intermediate with hydrazine. This intermediate may be prepared by reaction of p-chlorophenyl-2-pyridyl ketone and hydroxylamine hydrochloride to obtain a corresponding oxime, treating this p-chlorophenyl-2-pyridiyl oxime with hydrogen in the presence of precious metal catalyst to obtain p-chlorophenyl-2-piperidyl methylamine, and treating said methylamine with carbon disulfide and raising the temperature of the mixture to obtain a 3-thioxo imidazopyridine. This compound is then treated with a lower alkyl halide to obtain the corresponding 3-lower alkylthio imidazopyridine intermediate referred to above.

The process for preparing the 3-hydrazino imidazo pyridine of this invention (I) may be represented by the following reaction scheme.

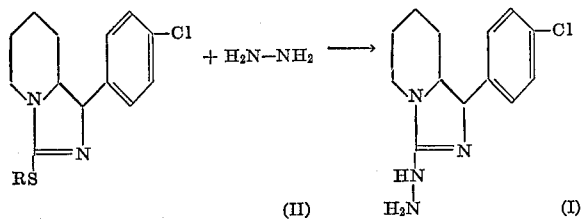

R in the above process represents loweralkyl, i.e. alkyl having 1 to 5 carbon atoms such as methyl, ethyl, isopropyl and the like.

In accordance with the above depicted process, a loweralkylthio imidazopyridine (II) is treated with hydrazine at an elevated temperature. A temperature of about 70° to 120° C. is satisfactory although a temperature of about 90° to 110° C. is preferred. Solvent such as alcohol may be used but is not considered necessary as it is preferred to simply use excess hydrazine reactant. Moreover, the exact temperatures used are not critical to the successful completion of the process. The 1-p-chlorophenyl - 3 - hydrazino - 1,5,6,7,8,8a - hexahydroimidazo [1,5-a]pyridine is readily recovered, e.g., in the form of its hydrochloride, using conventional recovery techniques. Standard methods may be used to convert this acid addition salt to the free base, e.g., it may be admixed with aqueous sodium carbonate and ether and the ether evaporated to provide the crystalline free base. The 3-loweralkylthio imidazopyridine starting compound for the process described above is prepared as indicated by the following diagram:

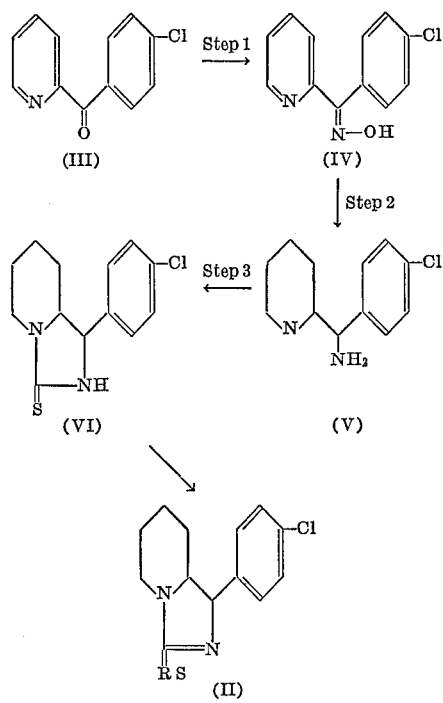

The compounds of Formula II are prepared according to a multistep process which involves the treating of p-chlorophenyl-2-pyridyl ketone (III), which is available commercially, with hydroxylamine hydrochloride in the presence of a weak base, such as sodium acetate, and solvents such as lower alkanols, e.g., ethanol, ether, tetrahydrofuran and the like (Step 1). The reaction temperature is preferably room temperature to the reflux temperature of the solvent, and desirably temperatures of about 20° to 120° C., may be utilized. Neither the reaction temperature nor the solvent is critical in the obtaining of the oxime (IV). This oxime (IV) is hydrogenated (Step 2) over precious metal catalyst such as platinum oxide in acid medium, e.g., glacial acetic acid, in order to provide compound (V). The hydrogen utilized is preferably maintained at atmospheric pressure and pressures of about 700 to 10,000 mm. Hg may be used. Conveniently, this process may be conducted at room temperature with temperatures of about 10° to 50° C. providing satisfactory results. Conventional recovery techniques are utilized for obtaining the product.

The compound of Formula VI is obtained from the methylamine of Formula V by treating the latter with carbon disulfide in solvent such as ether, tetrahydrofuran, aromatic hydrocarbons and the like (Step 3). The reaction conveniently takes place at room temperatures although reaction temperatures of about 0° to 60° C. may be used. The product is then cooled in an ice bath with stirring for about 2 hours. The resulting material is then heated at a temperature from about 100° to 200° C., preferably 120° to 180° C., for about 1 to 3 hours. The 3-thioxo imidazo[1,5-a]pyridine (VI) is recovered by conventional recovery techniques. The last stage (Step 4) of the process for preparing the 3-loweralkylthio imidazopyridine of Formula II involves treating the 3-thioxo compound (VI) with a loweralkyl halide, e.g., methyliodide, in solvent at elevated temperatures. Solvents such as lower alkanols, e.g., methanol and ethanol, or tetrahydrofuran, ether, aromatic hydrocarbons, e.g., benzene, and the like may be employed. Although neither the solvent nor the temperature utilized is critical, a temperature of about 70° to about 100° C. and preferably about 40° to about 80° C. may be utilized. The product (II) is then recovered using conventional techniques such as concentration, crystallization and the like.

Compound (I) and (VI) above may also be represented by their respective tautomeric equivalents as follows

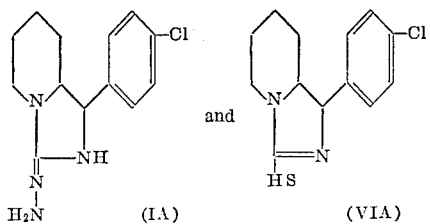

In order to simplify this description, however, Formulas I and VI only will be used, but it should be understood that either of the tautomeric forms may be represented.

The compounds of Formulas I, II and VI exist as stereoisomers. Separation and recovery of the respective isomers may be readily accomplished employing conventional techniques and all the isomers are included within the scope of this invention.

The imidazopyridines represented by Formulas I, II and VI above are useful because they possess pharmacological properties in animals, such as in mammals. In particular, these compounds are active hypotensive agents as indicated by their activity in anesthetized dog tested by blood pressure measurement using a mercury manometer or transducer via a catheter inserted in the carotid or femoral artery. When used as hypotensives, the compounds may be combined with one or more pharmaceutically acceptable carriers or adjuvants. They may be administered orally or parenterally and, depending upon the compound employed and the mode of administration, the exact dosage utilized may vary. Furthermore, compounds (I) and (II) may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate and the like. In general, satisfactory results are obtained when these compounds are administered at daily dosage of about 1 milligram to about 10 milligrams per kilogram of animal body weight. This daily dosage is preferably administered 3 to 5 times a day, or in sustained release form. For more large mammals, the daily dosage is from about 50 milligrams to about 60 milligrams. Dosage forms suitable for internal use comprise about 10 milligrams to about 20 milligrams of the active compound in intermediates administered with a solid or liquid pharmaceutically acceptable carriers or diluents.

A representative formulation suitable for oral administration is a tablet prepared by standard tabletting techniques which contains the following:

| Ingredient: | Parts by weight |
|---|---|
| 1 - p - chlorophenyl - 3-hydrazino-1,5,6,7,8,8a-hexahydroimidazo[1,5-a]pyridine | 10 |
| Tragacanth | 2 |
| Lactose | 79.5 |
| Corn starch | 5 |
| Talcum | 3 |
| Magnesium stearate | 2.5 |

The following example is provided for the purpose of illustration and not by way of limitation. It is not intended so as to limit the scope of the invention as defined in the appended claims.

EXAMPLE

Step 1.—p-Chlorophenyl-2-pyridyl oxime

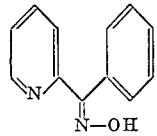

A mixture of p-chlorophenyl-2-pyridyl ketone (66 g.), hydroxylamine hydrochloride (42 g.), sodium acetate (48 g.) and ethanol (700 ml.) is heated under reflux for 2 hours. The cooled mixture is diluted with water (700 ml.) and the resultant crude p-chlorophenyl-2-pyridyl oxime (66 g.) collected and used directly for the next step.

Step 2.—p-Chlorophenyl-2-piperidyl methylamine

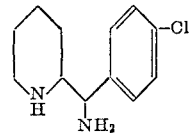

A mixture of this crude oxime (25 g.) obtained according to Step 1, platinum oxide (0.2 g.) and glacial acetic acid (50 ml.) is agitated under an atmosphere of hydrogen (50 p.s.i.) at room temperature overnight. The reaction mixture is filtered and the filtrate evaporated in vacuo. The residue is dissolved in water, made basic with sodium carbonate solution and extracted with methylene chloride. The extract was dried using sodium sulfate and evaporated to give the crude product, p-chlorophenyl-2-piperidyl methylamine, (14 g.) as an oil which is used directly for the next step.

Step 3.—1-p-chlorophenyl-3-thioxo-1,2,3,5,6,7,8,8a-octahydroimidazo[1,5-a]pyridine

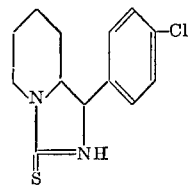

A solution of carbon disulfide (3.2 g.) in ether is added dropwise over 5 minutes to a stirred solution of p-chlorophenyl-2-piperidyl methylamine (crude 8.8 g.) in ether (120 ml.), and cooled in an ice bath. After stirring for ½ hour, the resultant solid is collected and heated in oil bath at 140° for 2 hours. The cooled mass is crystallized twice from methanol to give 5 g. substantially 1-p-chlorophenyl - 3 - thioxo - 1,2,3,5,6,7,8,8a - octahydroimidazo-[1,5-a]pyridine M.P. 191° to 192° C., (stereoisomer A). Recrystallization of the first mother liquor from acetonitrile-ether (1:2) several times gives 100 mg. substantially pure stereoisomer B; M.P. 176° to 177° C.

Step 4A.—1-p-chlorophenyl-3-methylthio-1,5,6,7,8,8a-hexahydroimidazo[1,5-a]pyridine (stereoisomer A)

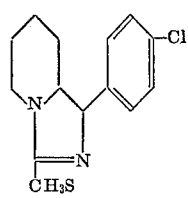

A mixture of 1-p-chlorophenyl-3-thioxo-1,2,3,5,6,7,8,8a-octahydroimidazo[1,5-a]pyridine (11 g. stereoisomer A) methyliodide (11 g.) and methanol (110 ml.) is heated under reflux for 2 hours. The reaction mixture is evaporated in vacuo and the residue is dissolved in ether (200 ml.) and 1 N sodium carbonate (100 ml.). The ether phase is dried with sodium sulfate and evaporated to give 13 g. of an oil which upon recrystallization from pentane, affords 11 g. of 1 - p - chlorophenyl - 3 - methylthio-1,5,6,7,8,8a - hexahydruimidazo[1,5 - a]pyridine (stereoisomer A); M.P. 96° to 97°.

Step 4B.—1-p-chlorophenyl-3-methylthio-1,5,6,7,8,8a-hexahydroimidazo[1,5-a]pyridine (stereoisomer B)

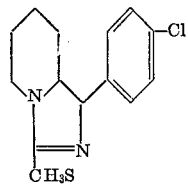

A mixture of 1-p-chlorophenyl-3-thioxo-1,2,3,5,6,7,7,8a-octahydroimidazo[1,5-a]pyridine (1 g.; stereoisomer B) and methyl iodide (1 ml.) in methanol (15 ml.) is refluxed 2 hours. The solution is evaporated in vacuo and the residue is dissolved in ether (15 ml.) and in sodium carbonate (10 ml.). The ether phase is dried with sodium sulfate and evaporated to give an oil which is crystallized from pentane to afford 700 ml. of 1-p-chlorophenyl-3-methylthio - 1,5,6,7,8,8a - hexahydroimidazo[1,5 - a]pyridine, M.P. 70–72° C.

Step 5.—1-p-chlorophenyl-3-hydrazino-1,5,6,7,8,8a-hexahydro-imidazo[1,5-a]pyridine dihydrochloride (stereoisomer A)

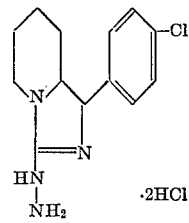

A mixture of 1-p-chlorophenyl-3-methylthio-1,5,6,7,8,-8a - hexahydroimidazo[1,5 - a]pyridine (10.5 g.; stereoisomer A) and 97% hydrazine (60 ml.) is stirred under reflux for 2 hours. The reaction mixture is cooled and diluted with water (50 ml.). The resultant crystals are collected by filtration and dried overnight in vacuo. The resultant material (9.5 g.) is dissolved in a mixture of ethanol-ether (1:2) and treated with excess hydrogen chloride gas to give a crystalline solid. Recrystallization from ethanol-ether (1:2) affords 7.1 g. of 1-p-chlorophenyl - 3 - hydrazino - 1,5,6,7,8,8a - hexahydro-imidazo-[1,5-a]pyridine dihydrochloride; M.P. 113–117° C.

What is claimed is:
1. 1-p-chlorophenyl - 3 - hydrazino-1,5,6,7,8,8a - hexahydroimidazo[1,5-a]pyridine.
2. A non-toxic pharmaceutically acceptable acid addition salt of the compound of claim 1.
3. A process for preparing the compound of claim 1, which comprises treating p-chlorophenyl-2-pyridyl ketone with hydroxylamine hydrochloride to obtain a corresponding oxime, hydrogenating said oxime to obtain p-chlorophenyl-2-piperidyl methylamine, treating said methylamine with carbon disulfide to obtain 1-p-chlorophenyl-3-thioxo - 1,2,3,5,6,7,8,8a - octahydroimidazo[1,5-a]pyridine, treating said imidazo pyridine with a loweralkyl halide to obtain 1-p-chlorophenyl-3-loweralkylthio-1,5,6,-7,8,8a-hexahydroimidazo[1,5-a]pyridine, and treating said hexahydroimidazopyridine with hydrazine.

References Cited

Chemical Abstracts, vol. 64, 196226, Bayer, June 1966.

HENRY R. JILES, Primary Examiner

S. WINTERS, Assistant Examiner

U.S. Cl. X.R.

260—293.2, 293.4, 296, 297; 424—267